United States Patent [19]
Germano

[11] Patent Number: 5,975,760
[45] Date of Patent: Nov. 2, 1999

[54] CENTRAL BEARING FOR A MOTOR VEHICLE REAR AXLE

[75] Inventor: Francesco Germano, Bietigheim-Bissingen, Germany

[73] Assignee: Dr. Ing. H.C.F. Porsche AG, Germany

[21] Appl. No.: 09/152,345

[22] Filed: Sep. 14, 1998

[30] Foreign Application Priority Data

Sep. 12, 1997 [DE] Germany .......................... 197 40 077

[51] Int. Cl.$^6$ .......................... F16C 27/06; B60G 5/02; F16F 1/38
[52] U.S. Cl. .................. 384/202; 267/141.3; 280/681; 384/220
[58] Field of Search .................. 384/202, 215, 384/220, 221, 222; 267/141, 141.1, 141.2, 141.3, 141.7; 280/681

[56] References Cited

U.S. PATENT DOCUMENTS

| | | | |
|---|---|---|---|
| 3,764,100 | 10/1973 | Young et al. | 267/141.3 |
| 3,976,338 | 8/1976 | Trachte et al. | 384/220 |
| 4,880,319 | 11/1989 | Haggerty | 384/220 X |
| 4,907,814 | 3/1990 | Foster | 384/202 X |
| 5,174,540 | 12/1992 | Gilliam | 267/141.3 |
| 5,246,248 | 9/1993 | Ferguson | 267/141.3 X |
| 5,340,220 | 8/1994 | Sprang et al. | 384/202 X |
| 5,472,226 | 12/1995 | Bunker | 280/681 |

FOREIGN PATENT DOCUMENTS

| | | |
|---|---|---|
| 2668 426 | 10/1990 | France . |
| 291791 | 7/1971 | Germany . |
| 30 28 124 A1 | 2/1981 | Germany . |
| 40 33 569 A1 | 10/1991 | Germany . |
| 40 37 966 A1 | 6/1992 | Germany . |
| 41 39 582 C1 | 11/1992 | Germany . |
| 44 19 221 C1 | 7/1995 | Germany . |

*Primary Examiner*—Thomas R. Hannon
*Attorney, Agent, or Firm*—Evenson, McKeown, Edwards & Lenahan, P.L.L.C.

[57] ABSTRACT

A central bearing for a bow-shaped rear axle of a motor vehicle is formed of three elastic elements. One central elastic element is arranged directly on a bearing axis support and is pressed by a bearing sleeve. Two additional exterior elastic elements are connected with this bearing sleeve and are supported on a bearing disk which is held on the bearing axis support by a press fit.

10 Claims, 1 Drawing Sheet

CENTRAL BEARING FOR A MOTOR VEHICLE REAR AXLE

BACKGROUND OF THE INVENTION

This application claims the priority of German application No. 197 40 077.9, filed Sep. 12, 1997, the disclosure of which is expressly incorporated by reference herein.

The present invention relates to a central bearing for a rear axle of a motor vehicle, and more particularly, to a central bearing having elastic elements which are arranged on a bearing axis support, are clamped into a bearing sleeve and are held in a bearing console which is connected with an axle tube of the rear axle.

DE 44 19 221 C1 describes a central bearing for a motor vehicle rear axle which is connected with an axle tube. DE 40 33 569 A1 describes an axial bush bearing which, clamped into a bearing sleeve, comprises elastic elements arranged on a bearing axis support.

SUMMARY OF THE INVENTION

An object of the present invention is to provide a central bearing for a rear axle of a motor vehicle which permits a defined elastic movement of the axle in all directions.

According to the present invention, this object has been achieved by providing that a first elastic element is arranged on the bearing axis support and is held in a clamped-in manner in a surrounding bearing sleeve on which, on both sides of a center plane, in each case, a second elastic element consisting of a sleeve element is supported which is held on the bearing axis support by way of face-side bearing disks.

Principal advantages achieved by way of the invention are that, with the construction and arrangement of the elastic elements forming the central bearing, an optimal cardanic movement of the vehicle axle is achieved in operation. For this purpose, the elastic elements are constructed in two or three parts and are held in a compressed manner on a bearing axis support.

The construction of the bearing according to the present invention provides a good mobility or cardanic system of the axle without limiting the elasticity. This linking and connection of the elastic elements to one another also avoids tears caused by extreme twisting.

The assembly of the elastic elements can take place in a simple manner, whereby the central elastic element is held on the bearing axis support by an exterior bearing sleeve and subsequently the exterior elastic elements are held in position by bearing disks pressed against the central bearing and in position.

Two embodiments of a central bearing are contemplated, in which the exterior elastic elements are, on one hand, either vulcanized to the bearing sleeve or are vulcanized to the bearing disk and the other end can then correspondingly support itself. The bearing disk is preferably held on the bearing axis support for the first elastic element by way of a press fit.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
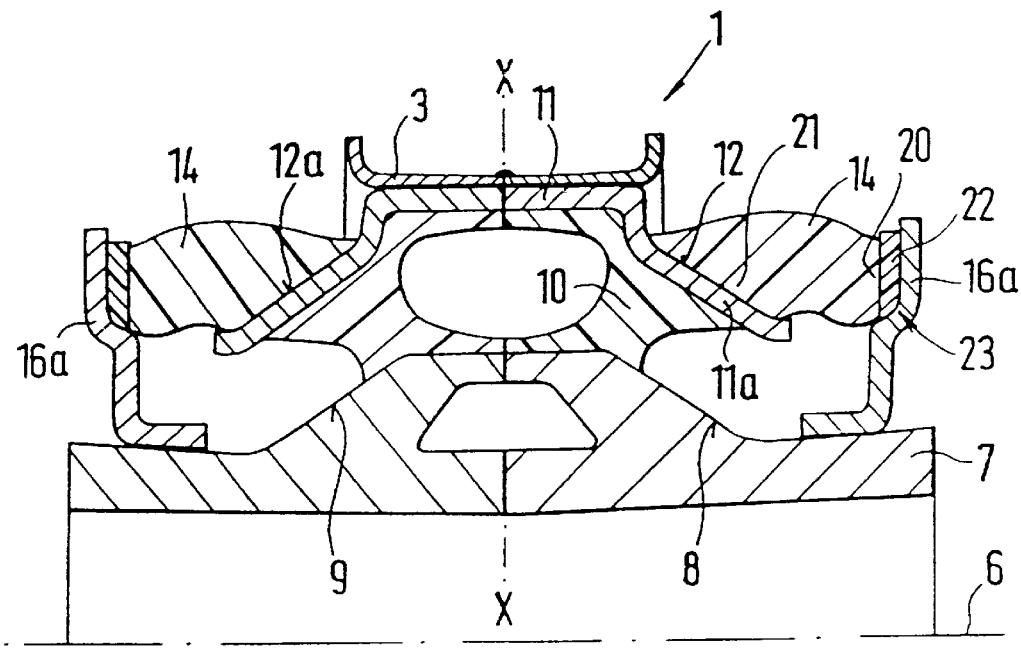
FIG. 1 is a cross-sectional view of a first embodiment of a central bearing with a pressed-on support on a bearing disk.

Each of the central bearings 1, 2 is connected in a receiving sleeve 3 of a bow 4 with an axle tube 5 of a rear axle. In the longitudinal center axis of a vehicle, the bearings 1, 2 are provided with a transversely extending swivel axis 6.

Each central bearing 1, 2 comprises a bearing axis support 7 with two mutually opposite sloped surfaces 8, 9 on which the first elastic element 10 is supported. A bearing sleeve 11, which has a sleeve part 11b arranged coaxially to the swivel axis 6 and an adjoining sleeve part 11a with sloped surfaces 12, 12a extending parallel to the sloped surfaces 8, 9, reaches around the first elastic element 10.

The additional elastic elements 14 arranged on both sides of the centrally arranged first elastic element 10 are sleeve elements which, in a clearance-forming spaced manner, are each connected on the face side with the bearing sleeve 11 and a bearing disk 16. This bearing disk 16 is connected with the bearing axis support 7 by a press fit.

According to the first embodiment shown in FIG. 1, the second elastic elements 14 are connected by their interior faces 20 to the sleeve part 11a having the sloped surfaces 12, for example, by way of vulcanizing. The additional exterior faces 21 of the second elastic element 14 are connected with a ring disk 22 made, for example, of plastic, which disk 22 is held in a receiving device 23 of the bearing disk 16a. The ring disk 22 can be fixed in the receiving device 23 to prevent twisting.

Figure 2:
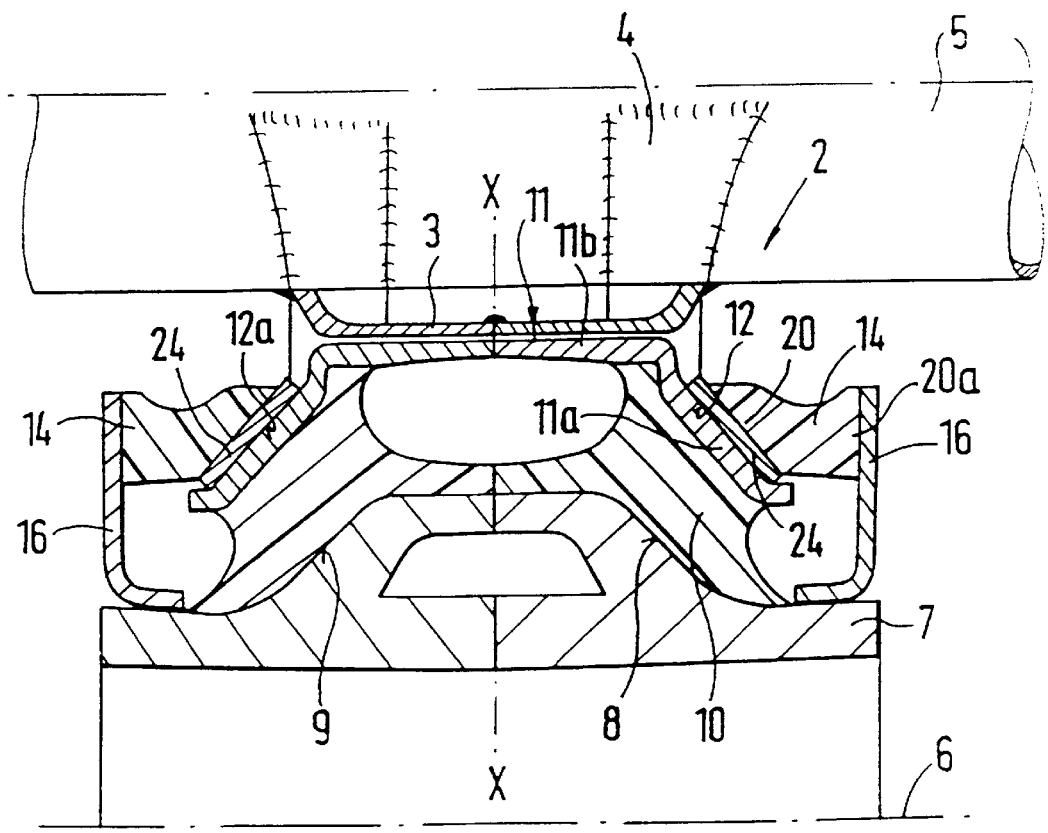
FIG. 2 is a cross-sectional view of a second embodiment of a central bearing with a pressed-on support on a bearing sleeve.

According to the other embodiment shown in FIG. 2, the interior faces 20 of the second elastic elements 14 are vulcanized to a ring disk 24 which pressingly rests on the sleeve part 11a. In contrast, the exterior faces 20a of the elastic elements 14 are vulcanized to the bearing disk 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Central bearing for a rear axle of a motor vehicle having elastic elements arranged on a bearing axis support, clamped into a bearing sleeve and held in a bearing console connected with an axle tube of the rear axle, wherein a first elastic element is operatively arranged on the bearing axis support and is held in a clamped-in manner in a surrounding bearing sleeve on which, on sides of a center plane, a second elastic sleeve elements are supported and held on the bearing axis support by face-side bearing disks.

2. Central bearing according to claim 1, wherein the first elastic element is arranged between sloped surfaces of the bearing axis support and the surrounding bearing sleeve, and the second elastic elements are supported on sloped surfaces and are connected with the bearing disk in an open, spaced manner with respect to the bearing axis support.

3. Central bearing according to claim 1, wherein the bearing disk is press-fittingly connected with the bearing axis support.

4. Central bearing according to claim 3, wherein the first elastic element is arranged between sloped surfaces of the bearing axis support and the surrounding bearing sleeve, and the second elastic elements are supported on sloped surfaces and are connected with the bearing disk in an open, spaced manner with respect to the bearing axis support.

5. Central bearing according to claim 1, wherein an exterior face of the second elastic elements is vulcanized to the bearing disk and an interior face connects the second elastic elements with a ring disk which is supported on the sloped surface of a part of the bearing sleeve part.

6. Central bearing according to claim 5, wherein the first elastic element is arranged between sloped surfaces of the bearing axis support and the surrounding bearing sleeve, and the second elastic elements are supported on sloped surfaces and are connected with the bearing disk in an open, spaced manner with respect to the bearing axis support.

7. Central bearing according to claim 6, wherein the bearing disk is press-fittingly connected with the bearing axis support.

8. Central bearing according to claim 1, wherein an interior face of the second elastic elements is vulcanized to a sloped surface of a bearing sleeve part, and an exterior face is connected with a disk which is supported in an area on the bearing disk which forms a receiving device.

9. Central bearing according to claim 8, wherein the first elastic element is arranged between sloped surfaces of the bearing axis support and the surrounding bearing sleeve, and the second elastic elements are supported on sloped surfaces and are connected with the bearing disk in an open, spaced manner with respect to the bearing axis support.

10. Central bearing according to claim 9, wherein the bearing disk is press-fittingly connected with the bearing axis support.

* * * * *